United States Patent
Nguyen

(10) Patent No.: US 8,126,910 B2
(45) Date of Patent: Feb. 28, 2012

(54) SYSTEM AND METHOD TO PERFORM MOBILE PRINTING FROM HANDHELD DEVICES

(75) Inventor: Truc Nguyen, San Diego, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 491 days.

(21) Appl. No.: 12/206,257

(22) Filed: Sep. 8, 2008

(65) Prior Publication Data

US 2009/0002771 A1    Jan. 1, 2009

Related U.S. Application Data

(63) Continuation of application No. 11/073,369, filed on Mar. 4, 2005, now Pat. No. 7,424,479.

(51) Int. Cl.
G06F 17/30 (2006.01)
G06F 7/00 (2006.01)

(52) U.S. Cl. ......... 707/770; 707/758; 707/781; 707/922

(58) Field of Classification Search ........................ None
See application file for complete search history.

(56) References Cited

U.S. PATENT DOCUMENTS

| | | | |
|---|---|---|---|
| 6,360,252 B1 | 3/2002 | Rudy et al. | |
| 6,401,085 B1 | 6/2002 | Gershman et al. | |
| 6,922,725 B2 * | 7/2005 | Lamming et al. | 709/227 |
| 2003/0154218 A1 * | 8/2003 | Eden | 707/200 |
| 2004/0034654 A1 | 2/2004 | Simpson et al. | |
| 2004/0137919 A1 * | 7/2004 | Biundo | 455/466 |
| 2004/0151291 A1 * | 8/2004 | Song | 379/100.01 |
| 2005/0012951 A1 * | 1/2005 | Madril et al. | 358/1.13 |

* cited by examiner

*Primary Examiner* — Greta Robinson
*Assistant Examiner* — James J Wilcox
(74) *Attorney, Agent, or Firm* — SoCal IP Law Group LLP; Steven C. Sereboff; Jonathan Pearce

(57) ABSTRACT

A system and method for printing a file on a remote printer via an electronic message. A personal electronic device transmits an electronic message requesting a listing of available electronic files. The personal electronic device then receives an electronic message in response to the request containing a list of available electronic files. At least one electronic file is then selected from among the listing of available files. The personal electronic device then receives, from the remote computer, an electronic message containing the selected electronic file. The personal electronic device then forwards the message containing the file to an image processing device.

10 Claims, 2 Drawing Sheets

SYSTEM AND METHOD TO PERFORM MOBILE PRINTING FROM HANDHELD DEVICES

CROSS REFERENCE TO RELATED APPLICATIONS

This application is a Continuation Application of U.S. patent application Ser. No. 11/073,369 filed on Mar. 4, 2005 now U.S. Pat. No. 7,424,479.

BACKGROUND

This invention is directed to a system and method for mobile printing. More particularly, this invention is directed to a system and method for accessing an electronic file via a mobile device for printing at a remote image generating device.

Typically, users routinely work with documents or other data while away from their office environment. Such users need to generate image data, by printing a document, and then need to distribute or perform other functions on such image data. Frequently, the only equipment the user has is a handheld device, such as a personal data assistant (PDA), or combination PDA/cellular telephone. These handheld devices are capable of storing and editing documents, receiving and sending electronic mail, sending and receiving voice communications, and storing/viewing images. However, such handheld devices, generally have limited storage and processing power, making storing large documents inefficient. In addition, having a full printer driver installed on the device is impractical, requiring capacious amounts of memory and processing power.

Previous attempts to address the limitations of the handheld device/printing have been made. For example, methods to include small printer drivers on the handheld have been implemented to enable the handheld device to print locally stored documents. However, this method requires the file to be printed be stored locally, limiting the number and size of the files available. Another example is the transmission to a printer of a URL reference of a file. However, this requires that each individual file be provided with a distinct URL reference, as well as the user having access to the web site hosting the URL files. Yet another attempt to use handheld devices for mobile printing involved the attachment of documents to electronic mail, forwarded directly to a printer for printing. The limitation of this approach is the requirement that the handheld device already have received the electronic mail.

Thus, there is a need for a user to use a handheld device to remotely access desktop files and have the files printed by a mobile printing service.

SUMMARY OF INVENTION

The present invention is directed to a system and method for mobile printing. In particular, the present invention is directed to a system and method for accessing an electronic file via a mobile device and printing the electronic file on a remote image generating device. More particularly, the present invention is directed to a system and method for using a handheld device to remotely access files stored on a remote desktop and submit one or more selected files to a mobile printing service for output thereon.

In accordance with the present invention, there is provided a method for performing document processing operations on a remote image processing device. A request is generated for all electronic files located in a selected storage area associated with a selected computing device. The request, contained within an electronic message, is then transmitted to the selected computing device. The electronic message is then received and includes data representing identification data associated with each of the electronic files located in the selected storage area associated with the selected computing device to an associated user. Selection data is then generated representing the identification data of at least one electronic file. This selection is then transmitted to the selected computing device via an electronic message. The at least one electronic file requested is then received via an electronic message, for document processing.

In a preferred embodiment, the method also includes selecting, from a list of image processing devices, an image processing device and transmitting the at least one electronic file, via an electronic message, to the image processing device for document processing.

Further in accordance with the present invention, there is provided a method for performing remote document processing operations. The method includes the step of receiving a request from a user, via an electronic message, for electronic files located in a selected storage area associated with a selected computing device. Identification data associated with the electronic files is then generated and transmitted, via an electronic identification message, from the storage area to the associated user. Selection data from the associated user is then received, representing the identification data of at least one of the electronic files. The electronic file corresponding to the identification data is then retrieved from the storage area and transmitted, via an electronic message, to at least one of an associated remote portable device and an associated remote image processing device for document processing.

In a preferred embodiment, the method further includes the steps of receiving, from the portable electronic device, data representing the amount of available associated memory and determining the file size corresponding to the requested electronic file. The file size is determined to be larger than the amount of available associated memory. In response to this determination, the electronic file is then forwarded, via an electronic message, to an associated image processing device.

Still further, in accordance with the present invention, there is provided a system for performing document processing operations on a remote image processing device. The system includes means adapted for generating a request for all electronic files located in a selected storage area associated with a selected computing device. The system also includes means adapted for transmitting the request, via an electronic message, to the selected computing device. Means adapted for receiving, from an electronic message, are then employed to receive data representing the identification data associated with each of the electronic files located in the selected storage area associated with the selected computing device to an associated user. The system further includes means adapted for generating selection data representative of identification data associated with at least one electronic file and means adapted for transmitting, via an electronic message, the selection data to the selected computing device. In addition, the system comprises means adapted for receiving the at least one electronic file, via an electronic message, for document processing.

Further in accordance with the present invention, there is provided a system for performing remote document processing operations. The system has means adapted for receiving a request, via an electronic user message, from an associated user for electronic files located in a selected storage area associated with a selected computing device. Generating means are included for generating identification data associated with the electronic files. The system also includes transmitting means to transmit, via an electronic identification message, the identification data from the selected storage area to the associated user. The system further includes receiving means to receive selection data from the associated user representing the identification data associated with at least one electronic file. Additionally, the system includes means adapted for retrieving the at least one electronic file from the selected storage area in response to the received selection data; and means adapted for transmitting the at least one electronic file, via an electronic message, to at least one of an associated remote portable device and an associated remote image processing device for document processing.

Still other aspects of the present invention will become readily apparent to those skilled in this art from the following description wherein there is shown and described a preferred embodiment of this invention, simply by way of illustration of one of the best modes suited for to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

The present invention is directed to a system and method for printing a document from a remote device. More particularly, the present system is directed to a system and method that enables a user to access a remote personal computer from a mobile device and print an electronic file on a remote image processing device using a short message service (SMS). The skilled artisan will appreciate that the use of the short message service format of the electronic mail, in accordance with the following description, is used for exemplification purposes only and the present invention is equally capable of employing different electronic mail message formats, without departing from the spirit and scope of the present invention.

Figure 1:
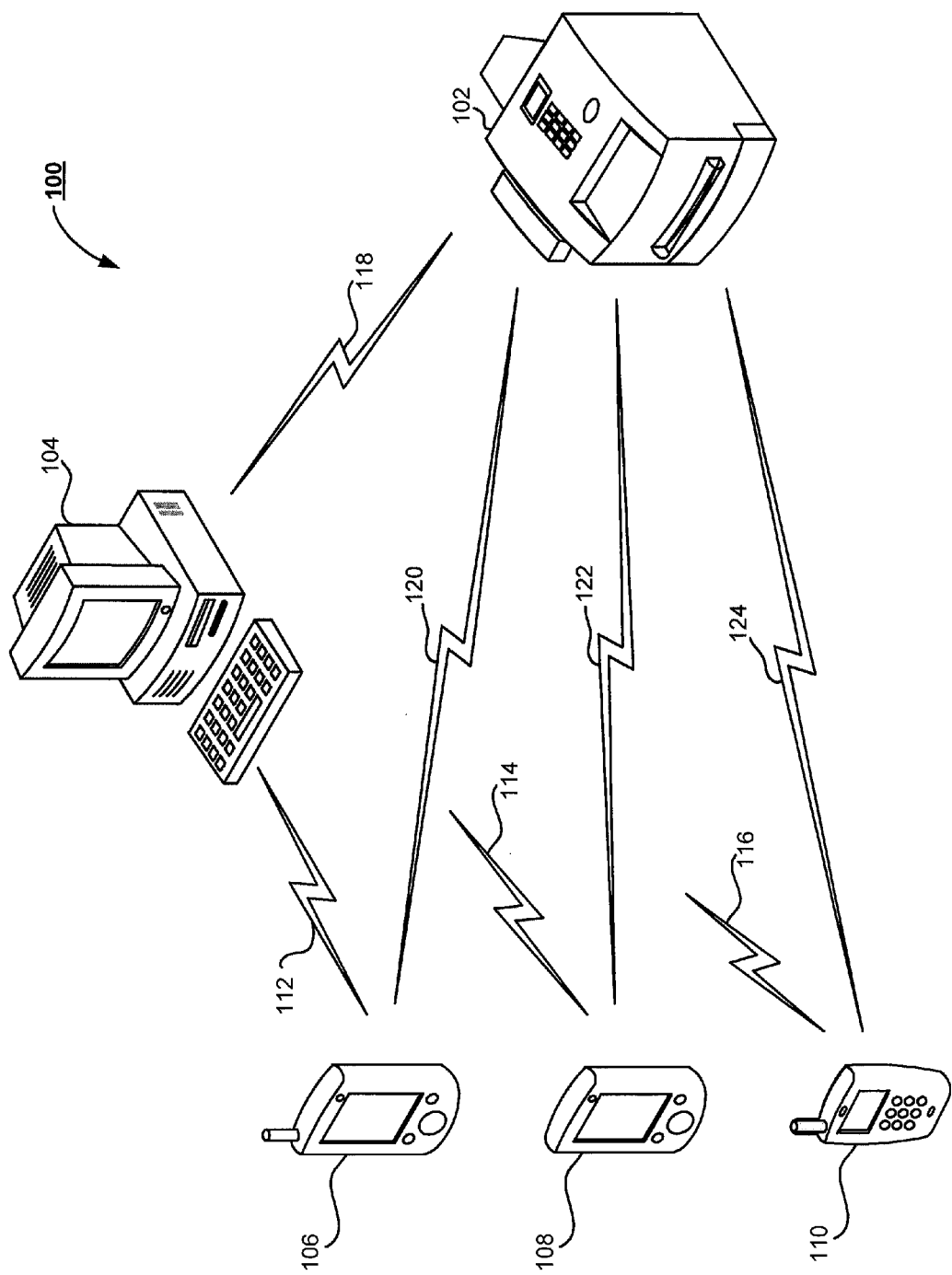
FIG. 1 is a block diagram illustrating a system in accordance with the present invention.

Turning now to FIG. 1, there is illustrated a block diagram of a system 100 in accordance with the present invention. As shown in FIG. 1, the system 100 suitably comprises at least one image processing device, as illustrated by multifunction peripheral device 102, for receiving and processing electronic image files. It will be appreciated by those skilled in the art that document processing device is any suitable document processing device known in the art, such as a copier, printer, scanner, facsimile and the like, or any combination thereof. Suitable commercially available document processing peripherals include, but are not limited to, the Toshiba e-Studio Series Controller. The multifunction peripheral device 102 is suitably adapted to communicate with the Internet, or other computer data network.

In the present invention, a user accesses a multifunctional peripheral device 102, preferably the user accesses the multifunction peripheral device 102 in a non-office environment, such as an airport lounge or business center. Other non-office environment locations include, but are not limited to, university campuses, conference centers, libraries, third-party stores and hotels. As used herein, the term mobile printing service and the multifunction peripheral device, described in FIG. 1, are used interchangeably and refer to a multifunction peripheral device located outside the normal business environment. In a preferred embodiment, the user accesses the multifunction peripheral device 102 via a portable, or handheld, electronic device, such as a combination cellular phone/PDA 106, a PDA 108, or a smartphone 110. As will be understood by those skilled in the art, the portable electronic devices 106, 108, 110 are web-enabled, i.e., equipped to communicate with the multifunction peripheral device 102 via a suitable communications link, 120, 122, 124, respectively. In the preferred embodiment, the communications links 120, 122, 124 are suitably established via the Internet. It will be understood by those skilled in the art that the combination cellular telephone/PDA 106 is any suitable personal data assistant capable of voice and data communications, including, for example and without limitation, a RIM device, Blackberry, Treo, or other multifunction data assistant.

In one embodiment, the user accesses the multifunction peripheral device 102 image processing services via communications links 112, 114, 116 between the portable electronic devices 106, 108, 110 and a personal computer 104. The personal computer 104, in data communication with the multifunction peripheral device 102 via a suitable communications link 118. The skilled artisan will appreciate that the communications link 118 is any data communications channel known in the art, including, but not limited to LAN, the Internet, directly via 802.11g (WiFi), Bluetooth, or other 802.11(X) wireless communications channels. The personal computer 104 suitably includes an associated storage device (not shown), such as a hard disk drive, for storing one or more electronic files. The personal computer 104 is shown in FIG. 1 as a desktop computer, however the skilled artisan will appreciate that this is for exemplification purposes only and the present invention is capable of using a document server, a laptop computer, a tablet computer, and the like, for storing an electronic document file and communicating the same to the multifunction peripheral device 102 and/or the portable electronic devices 106-110.

In the preferred embodiment, the user accesses the personal computer 104 via the handheld device 106-110 using an Internet communications link 112-116. In this embodiment, the user is in a location providing wireless Internet access, such as an airport lounge, or retail establishment. In accordance with the present invention, the handheld device, 106-110, suitably includes an electronic mail application, operative to generate and receive electronic mail messages. In one embodiment, the electronic mail application is a cellular telephone text messaging application, such as a short message service compatible program. The handheld device 106-110 transmits a message to the personal computer 104, requesting a listing of electronic files, such as documents, stored on the personal computer 104. The personal computer 104 parses the message to determine the request, if any, sent by the handheld device 106-110. When the handheld device 106-110 has requested a listing of available files present on the personal computer 104, the computer 104 retrieves a listing of such documents and generates a reply message to the handheld device 106-110.

The handheld device 106-110, via an integrated display, shows the list to the user. Each item on the list is assigned a document code, for ease of selection on the handheld device 106-110. For example, the personal computer 104 inserts an alphanumeric identifying code into the reply message corresponding to each individual file of the list. The user then submits a document request message to the personal computer 104 indicating the alphanumeric code of the selected file. For example, and without limitation, the submitted message suitably includes a "GET", or other recognized retrieval command.

The personal computer 104 then transmits the selected file to the handheld device 106-110 via the communications link 112-116. The skilled artisan will understand that in the preferred embodiment, the file is transmitted to handheld device 106-110 as an attachment to an electronic mail message sent from the personal computer 104. The skilled artisan will further appreciate that any means known in the art for attaching a file to an electronic text message is capable of being employed, without departing from the present invention.

The handheld device 106-110, depending upon the capabilities of the device's associated memory and/or processor, is able to display the file to the user. Alternatively, the user simply forwards the message, with the attachment, to the multifunction peripheral device 102 via the communications link 120-124. The present invention further enables the personal computer 104 to transmit, at the request of the handheld device 106-110, the selected file directly to the multifunction peripheral device 102, when, for example, the selected file is too large to be stored on the handheld device 106-110, or when storing the file would fill the handheld device 106-110 associated memory to capacity. In one embodiment, as the skilled artisan will appreciate, the subject invention suitably uses a mail server to facilitate the transmission of electronic messages between the handheld device 106-110 and the personal computer 104. In this embodiment, it will be understood by those skilled in the art that the mail server is capable of preventing some or all of an attachment from being transmitted to the handheld device 106-110.

Once the user has selected and received the desired file, the message containing the file as an attachment, is suitably forwarded to the mobile printing service, e.g., the multifunction peripheral device 102. The multifunction peripheral device 102 then outputs the file in accordance with instructions contained with the file, or alternatively, within the text message to which the file was attached.

Figure 2:
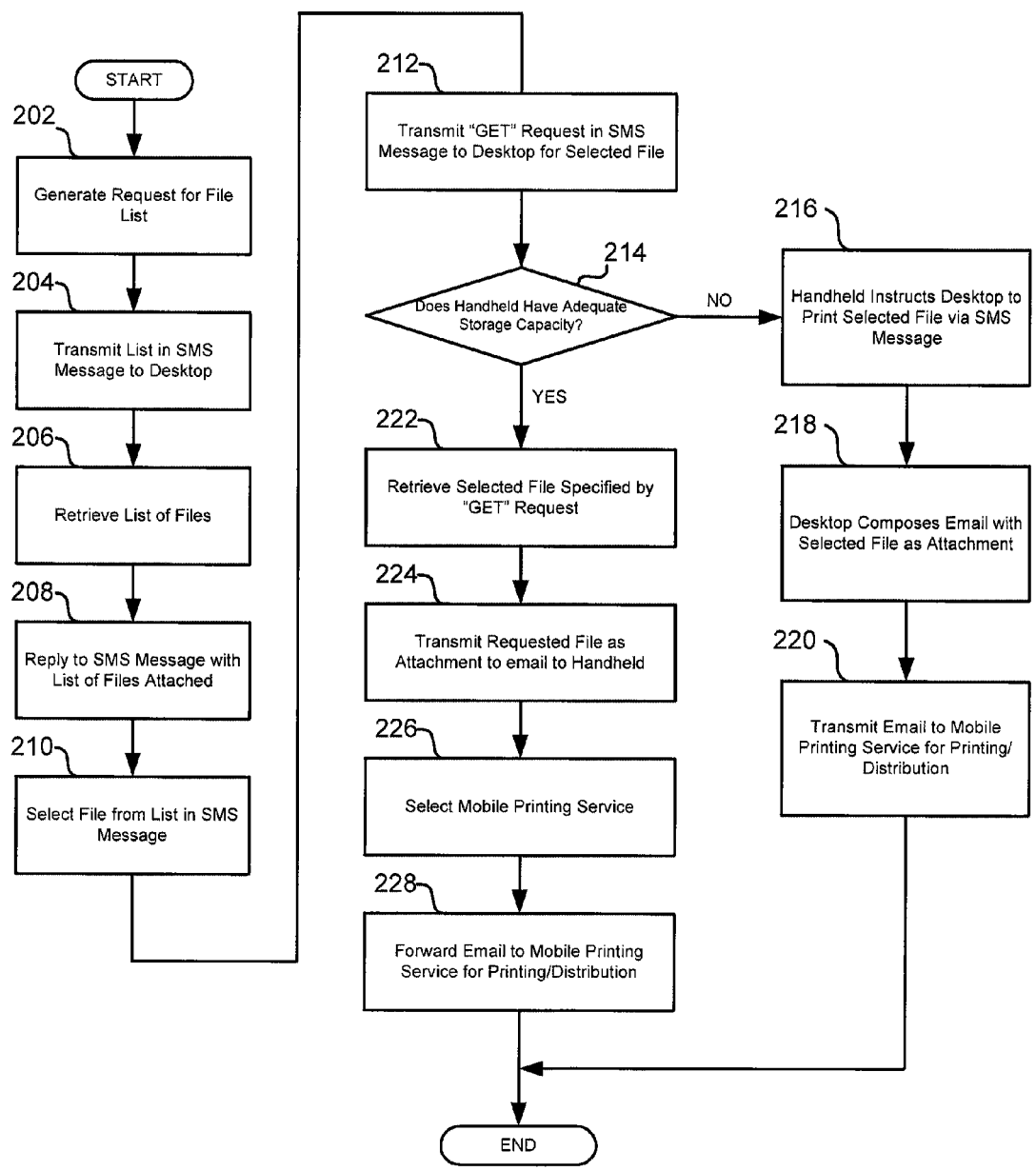
FIG. 2 is a flow chart illustrating a method in accordance with the present invention.

Turning now to FIG. 2, there is shown a flowchart illustrating the method of retrieving an electronic file from a remote computer by a handheld device for output by a mobile print service. As illustrated in FIG. 2, the method begins at step 202 wherein the user composes a text message requesting a listing of files available from the personal computer 104. The text message suitably includes a "LIST" command, which is transmitted to the personal computer 104 in a short message service text message at step 204. The text message is then parsed by the personal computer 104 and the "LIST" command is ascertained. At step 206, the personal computer 104 retrieves a list of files available for remote access. In the preferred embodiment, the list of files suitably includes those files preselected for remote access by the handheld device 106-110. The personal computer 104 then replies to the handheld device 106-110 with the retrieved list of available files at step 208.

At step 210, the user selects one or more files from the list of remotely available files. The handheld device 106-110 then transmits a text message to personal computer 104 requesting the one or more selected files at step 212. The personal computer 104 receives the text message and parses the message to retrieve a "GET" command. A determination is then made at step 214 that the requested file is too large for transmission to the requesting handheld device 106-110. Thus, when the requesting handheld device 106-110 lacks adequate memory to store the requested file, the personal computer 104 does not transmit the file as an attachment to a message to the handheld device 106-110. Instead, the handheld device 106-110 instructs the personal computer 104 to print the selected file via a suitable "PRINT" command, which is parsed from a message transmitted to the personal computer 104 at step 216. At step 218, the personal computer 104 composes an electronic mail message having the selected file as an attachment. This electronic mail is then transmitted to the multifunction peripheral device 102 at step 220 for printing or distribution in accordance with user instructions. The skilled artisan will appreciate that although a single multifunction peripheral device is illustrated in FIG. 1, the present invention enables a user to select from among a plurality of multifunction peripheral devices provided by the mobile document processing service. The multifunction peripheral device 102 suitably retrieves document processing instructions from the electronic mail sent by the personal computer 104, which in turn has user input printing instructions contained therein.

Returning to step 214, a positive determination, e.g., adequate memory, results in the personal computer 104 retrieving the selected file at step 222. The personal computer 104 then attaches the selected file to a response message and transmits the message with the attachment to the handheld device 106-110 at step 224. Once the message is received by the handheld device 106-110, the user has several available options. For example, the user is able to view, depending upon the type of file requested and the applications resident on the handheld device 106-110, the file, or alternatively, issue instructions to output the file at an image generating device. At step 226, the user suitably selects, via the handheld device 106-110, a multifunction peripheral device 102 to output the selected file. Having selected the desired multifunction peripheral device 102, the user then instructs the handheld device 106-110 to forward the message to the multifunction peripheral device 102 at step 228 for printing or distribution in accordance with user input instructions. The skilled artisan will appreciate that the forwarded electronic mail suitably includes document processing instructions corresponding to the operations and features the multifunction peripheral device is capable of performing.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A method for requesting a document processing operation using a handheld device comprising:
   transmitting, via short message service to a personal computer, a request for a listing of electronic files located in a storage area associated with the personal computer;
   receiving, via short message service from the personal computer, the listing of electronic files located in the storage area; and
   transmitting, via short message service to the personal computer, selection data representative of a selected electronic file from the listing, receipt of the selection data causing the personal computer to transmit the selected electronic file and associated processing instructions to a multifunction peripheral device via email using a method selected from the group consisting of (1) from the personal computer to the multifunction peripheral device and (2) from the personal computer to the handheld device which then transmits the selected electronic file via email to the multifunction peripheral device for printing.

2. The method of claim 1, further comprising selecting the multifunction peripheral device from a list of available multifunction peripheral devices.

3. The method of claim 1, wherein the selected electronic file is sent via email as an attachment.

4. A method for performing a document processing operation comprising:
   generating a listing of electronic files stored in a storage area associated with a personal computer in response to a request from a user received on the personal computer via short message service from a handheld device;
   transmitting, via a simple message service from the personal computer, the listing of electronic files to the handheld device;
   receiving, via short message service to the personal computer, a selection of a electronic file from the listing of electronic files; and
   transmitting the electronic file from the personal computer to a multifunction peripheral device via email using a method selected from the group consisting of (1) from the personal computer to the multifunction peripheral device and (2) from the personal computer to the handheld device which then transmits the selected electronic file via email to the multifunction peripheral device for printing.

5. The method of claim 4, wherein the handheld device is one of a personal data assistant, a smart phone, and a combination cellular telephone/personal data assistant.

6. The method of claim 4, wherein the selected electronic file is sent via email as an attachment.

7. A system for performing a document processing operation on a multifunction peripheral device, the system comprising a handheld device for:
   transmitting via short message service to a personal computer, a request for a listing of electronic files located in a storage area associated with the personal computer;
   receiving, via short message from the personal computer, a listing of the electronic files located in the storage area; and
   transmitting, via short message service to the personal computer, selection data representative of a selected electronic file, receipt of the selection data causing the personal computer to transmit the selected electronic file along with processing instructions to a multifunction peripheral device via email using a method selected from the group consisting of (1) from the personal computer to the multifunction peripheral device and (2) from the personal computer to the handheld device which then transmits the selected electronic file via email to the multifunction peripheral device for printing.

8. The system of claim 7 further comprising the personal computer for:
   generating the listing of electronic files stored in the storage area in response to the request from the handheld device;
   transmitting, via a simple message service, the listing of electronic files to the handheld device; and
   transmitting, via email, the selected electronic file to a multifunction peripheral device for processing.

9. The system of claim 8 wherein the personal computer is further for:
   determining that the available memory on the handheld device is too small to accept the electronic file; and
   transmitting the electronic file directly from the personal computer to the multifunction peripheral device.

10. The system of claim 7 wherein the handheld device is further for selecting the multifunction peripheral device from a list of available document processing devices.

* * * * *